United States Patent
Kunieda

(10) Patent No.: US 8,693,049 B2
(45) Date of Patent: Apr. 8, 2014

(54) IMAGE PROCESSING APPARATUS FOR SELECTING A FEATURE AREA, IMAGE PROCESSING METHOD AND STORAGE MEDIUM THEREFOR

(75) Inventor: Hiroyasu Kunieda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 978 days.

(21) Appl. No.: 12/476,730

(22) Filed: Jun. 2, 2009

(65) Prior Publication Data

US 2009/0323088 A1    Dec. 31, 2009

(30) Foreign Application Priority Data

Jun. 25, 2008   (JP) .................................. 2008-166252

(51) Int. Cl.
  *G06K 1/00* (2006.01)
  *G06K 15/00* (2006.01)
  *H04N 5/235* (2006.01)

(52) U.S. Cl.
  USPC .......... 358/1.9; 358/2.1; 358/1.18; 348/222.1

(58) Field of Classification Search
  USPC ............. 358/1.9, 2.1, 1.18; 348/207.2, 222.1; 382/170, 190
  See application file for complete search history.

(56) References Cited

U.S. PATENT DOCUMENTS

| | | | | |
|---|---|---|---|---|
| 6,104,829 | A * | 8/2000 | Nakajima | 382/167 |
| 6,570,672 | B1 * | 5/2003 | Hattori | 358/1.2 |
| 7,548,645 | B2 | 6/2009 | Iida et al. | |
| 7,564,576 | B2 * | 7/2009 | Kato et al. | 358/1.15 |
| 7,564,994 | B1 * | 7/2009 | Steinberg et al. | 382/118 |
| 7,663,777 | B2 * | 2/2010 | May | 358/1.18 |
| 8,068,240 | B2 * | 11/2011 | Shiohara et al. | 358/1.13 |
| 8,121,404 | B2 * | 2/2012 | Xiao et al. | 382/167 |
| 2002/0018228 | A1 * | 2/2002 | Torigoe | 358/1.14 |
| 2004/0160632 | A1 * | 8/2004 | Kato et al. | 358/1.15 |
| 2005/0024498 | A1 | 2/2005 | Iida et al. | |
| 2009/0141144 | A1 * | 6/2009 | Steinberg | 348/222.1 |

FOREIGN PATENT DOCUMENTS

JP   2004-207987   7/2004
JP   2005-045497 A   2/2005

* cited by examiner

*Primary Examiner* — Barbara Reinier
(74) *Attorney, Agent, or Firm* — Fitzpatrick, Cella, Harper & Scinto

(57) ABSTRACT

An image processing apparatus that switches a detecting function to be used in accordance with a state of a printing apparatus when different devices respectively have similar detection functions.

13 Claims, 17 Drawing Sheets

IMAGE PROCESSING APPARATUS FOR SELECTING A FEATURE AREA, IMAGE PROCESSING METHOD AND STORAGE MEDIUM THEREFOR

BACKGROUND OF THE INVENTION

1. Field of the Invention

The present invention relates to an image processing apparatus, an image processing method, a program, and a storage medium that switch a detection function to be used in accordance with a state of a printing apparatus when different devices respectively have similar detection functions.

2. Description of the Related Art

In recent years, detection functions for image feature areas such as face detection technologies have been loaded in various types of products. For example, loading a face detecting function in a digital camera enables to focus on a person when taking a picture. With respect to conventional digital cameras, it is necessary for a user to adjust a digital camera so as to focus on the object in order to focus on an object. As a result, its composition and the like are limited, which makes it difficult to reflect a user's intention in some cases. However, utilizing a face detecting technology enables to automatically focus on a person, which makes it possible to take a picture with free composition.

Further, in recent years, face detecting functions have been loaded in printing apparatuses as well. Utilizing a face detecting function of a printing apparatus enables to judge whether or not an image to be printed is figure photography, and to automatically correct the photography so that the skin area of the person becomes an ideal skin color.

Even in a case in which a face detecting function is not loaded in a printing apparatus, provided that face information detected by a digital camera is embedded into a part of Exif (Exchangeable image file format) information, it is possible to perform correction processing taking into consideration a face area in the printing apparatus.

For example, the invention disclosed in Japanese Patent Laid-Open No. 2004-207987 performs image correction on the basis of face coordinates to print an image. The printed image stores the face coordinates detected at the time of taking the picture as a part of the Exif information. In the printing apparatus, the face coordinates are extracted from the Exif information in the image, and the printing apparatus performs correction processing on the basis of the face coordinates.

However, in Japanese Patent Laid-Open No. 2004-207987, a technique of controlling a face detection result carried out by the digital camera and a face detection result carried out in the printing apparatus has not been proposed. Further, because the processings are not controlled in accordance with a state of the printing apparatus, it is impossible to take into consideration the balance between image quality and speed.

Further, utilizing the face information included in the Exif information causes face detection processing to be highly-loaded so as not to be executed inside the printing apparatus, which accelerates a processing speed. However, there are various types of face information included in Exif information depending on manufacturers, that include unknown factors. Therefore, when correction processing is performed in accordance with an analysis result of face area, it is impossible to perform optimum correction processing by using unknown face information in some cases.

FIGS. 12 and 13 are diagrams showing definitions of face area by separate manufacturers. FIG. 12 defines an internal part of a face centering on a skin area within an image area 1201 as a face area 1202. FIG. 13 defines an area including hair within an image area 1301 as a face area 1302. Because the definitions of face area are different from one another, their average saturations and hues in the face areas as well are different from one another. In the face area defined in FIG. 13, analysis of, not only the information on skin, but also the information on hair and background is performed. Therefore, the information for determining correction factors includes errors, which makes it impossible to perform optimum correction.

In this way, a trade-off relationship between image quality and speed is brought about depending on the face information to be utilized. In particular, when correction processing is performed inside a printing apparatus, it is necessary to select face information to be utilized in accordance with a print setting or a printing status of a printing job or the like. For example, when the quality serving as an item for print setting is set to "quick," a processing flow in which speed is prioritized over image quality is required. In contrast thereto, when the quality serving as an item for print setting is set to "fine," a processing flow in which image quality is prioritized over speed is required.

For this reason, when different devices respectively have similar detection functions, it is necessary to control which detection function is to be used in accordance with a state of a printing apparatus.

SUMMARY OF THE INVENTION

In order to solve the above-described problem, an image processing apparatus according to the present invention includes an acquisition unit for acquiring image data from an input device and a result of detecting an image feature area in the image data, a judgment unit for judging a print setting which is set in the image data, a detection unit for detecting the image feature area in the image data, a selection unit for selecting one of a detection result acquired from the input device and a detection result by the detection unit in accordance with the print setting judged by the judgment unit, and a correction unit for correcting the image data on the basis of the detection result selected by the selection unit.

In accordance with the present invention, when different devices respectively have similar detection functions, switching a detection function to be utilized in accordance with a state of a printing apparatus enables to take into consideration the balance between image quality and speed in printing.

Further features of the present invention will become apparent from the following description of exemplary embodiments (with reference to the attached drawings).

DESCRIPTION OF THE EMBODIMENTS

Hereinafter, embodiments according to the present invention will be described.

Embodiment 1

Hereinafter, an image processing apparatus of Embodiment 1 will be described.

Figure 1:
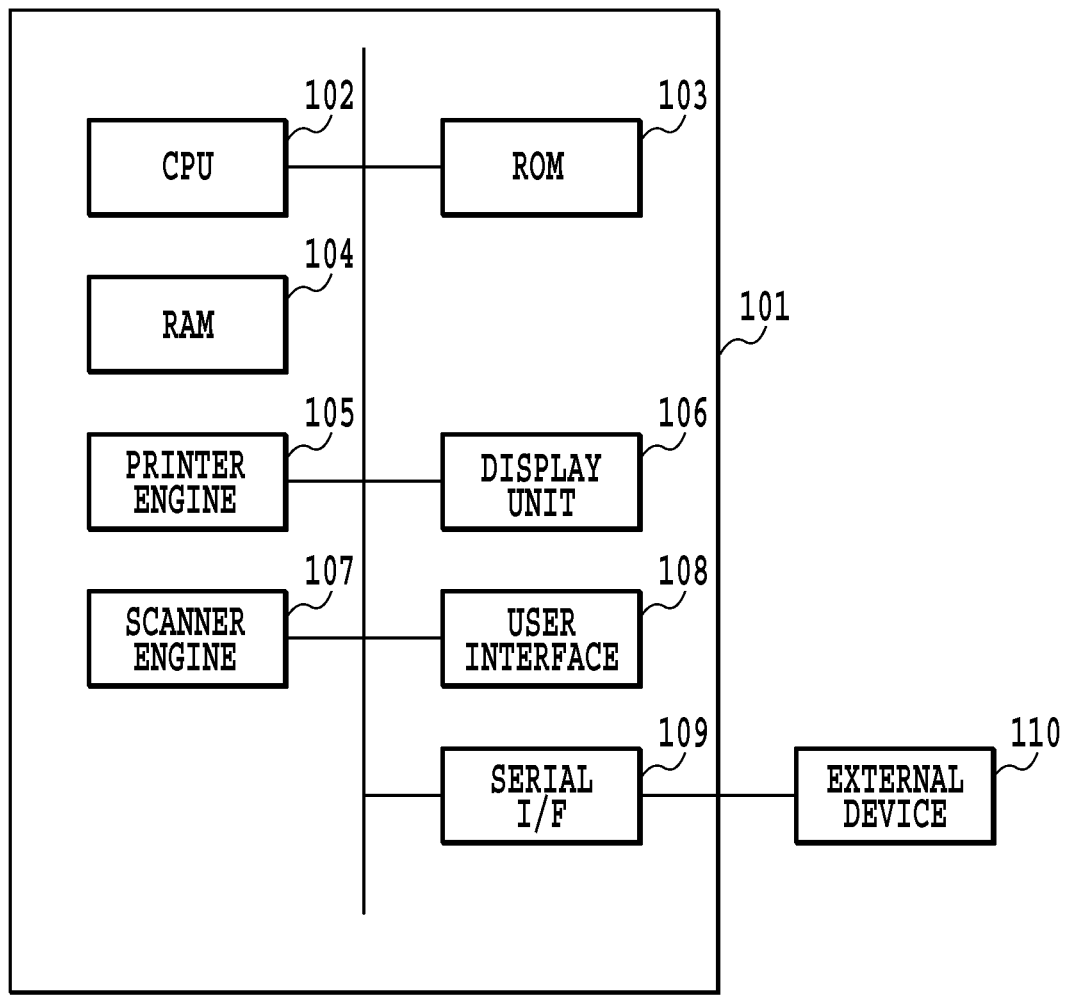
FIG. 1 is a diagram showing an example of hardware inside a printing apparatus.

FIG. 1 shows an example of hardware in a printing apparatus 101 serving as an image processing apparatus. The printing apparatus 101 includes a CPU 102, a ROM 103, a RAM 104, and a printer engine 105 for executing print processing. Further, in recent years, because multifunctional peripherals in which a scanner is mounted in a printing apparatus have come to the forefront, the printing apparatus may have a scanner engine 107 for scanning a manuscript. Further, a display unit 106 is used for configuring various settings for a sheet, printing quality, and the like at the time of performing printing. Further, a user interface 108 includes a touchscreen, and a serial I/F 109 is an I/F (interface) for interfacing to an external device 110. The external device 110 is, for example, a digital camera.

As shown in FIG. 1, the CPU 102, the ROM 103, the RAM 104, the printer engine 105, the display unit 106, the scanner engine 107, the user interface 108, and the serial I/F are connected to each other via a system bus.

In addition, not only those, but also various components may be considered as hardware components in the printing apparatus. Those are, for example, a power supply unit, a feeder unit for handling sheets, an interface for directly interfacing to a network, and the like. However, because those are not directly mentioned in the present embodiment, descriptions thereof will be omitted.

Figure 2:
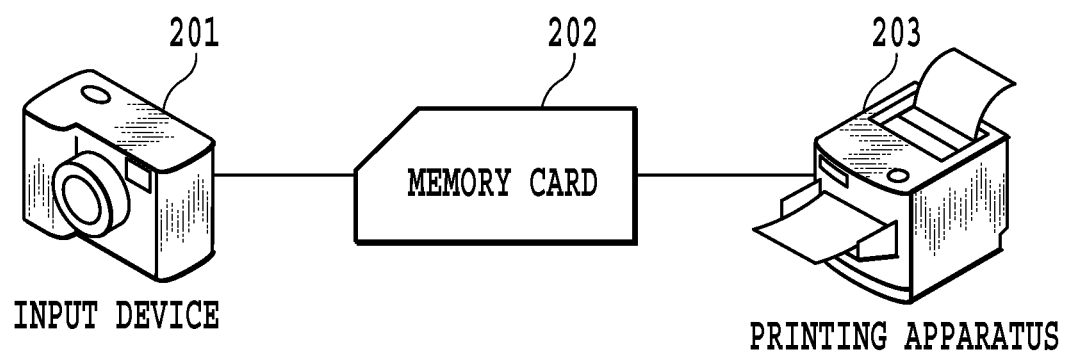
FIG. 2 is a diagram showing an example as a connection environment for a printing apparatus.
Figure 3:
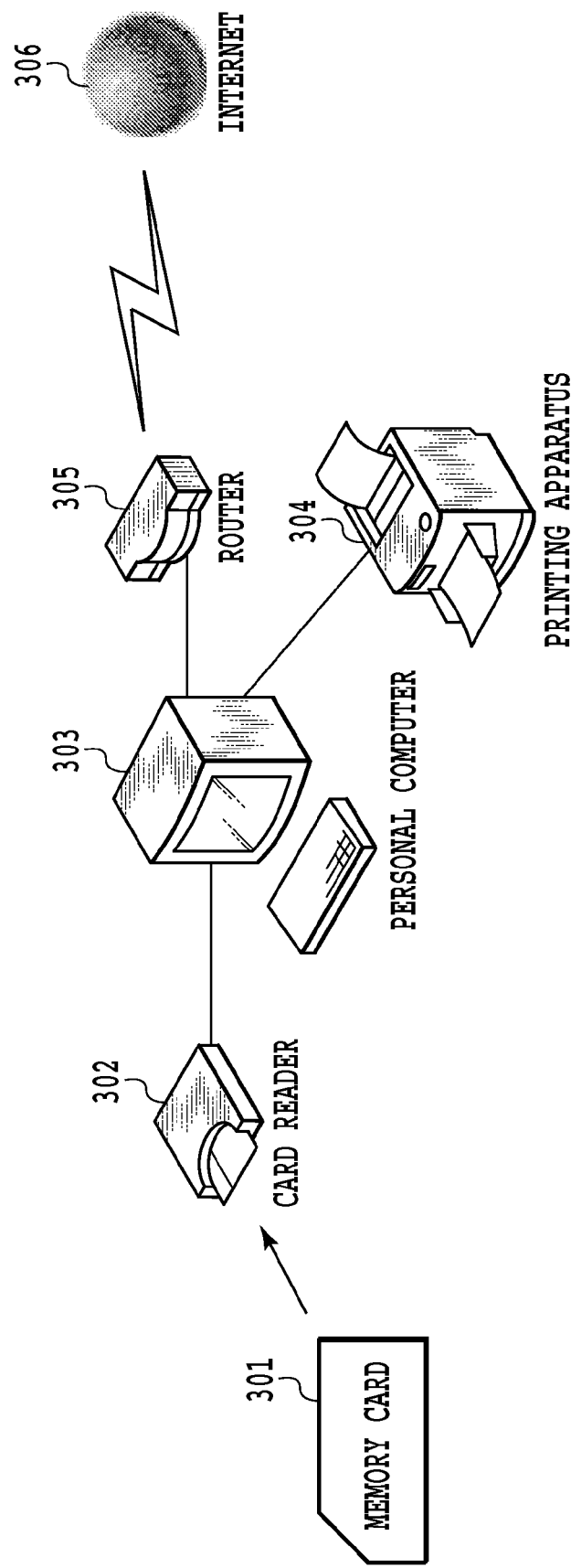
FIG. 3 is a diagram showing an example as a connection environment for a printing apparatus.

FIGS. 2 and 3 show examples as printing environments conceivable in the present embodiment.

FIG. 2 shows a mode in which image data photographed by an input device is printed. First, image data photographed by an input device 201 is stored in a memory card 202. Next, the memory card 202 is connected to a printing apparatus 203, and the photographed image data is printed out of the printing apparatus 203.

There, the input device 201 may be, for example, a digital camera.

FIG. 3 shows an example of a printing environment composed mainly of a personal computer. A personal computer 303 has a hard disk. Image data in a memory card 301 may be stored on the hard disk of the personal computer 303 via a card reader 302. Further, image data downloaded from Internet 306 may be stored on the hard disk of the personal computer 303 via a router 305. Further, data obtained through a route except for the card reader 302 and the router 305 may be stored on the hard disk of the personal computer 303.

The data stored on the hard disk of the personal computer 303 is operated by the personal computer 303 to be printed out of a printing apparatus 304.

Hereinafter, the input device in Embodiment 1 will be described.

Figure 6:
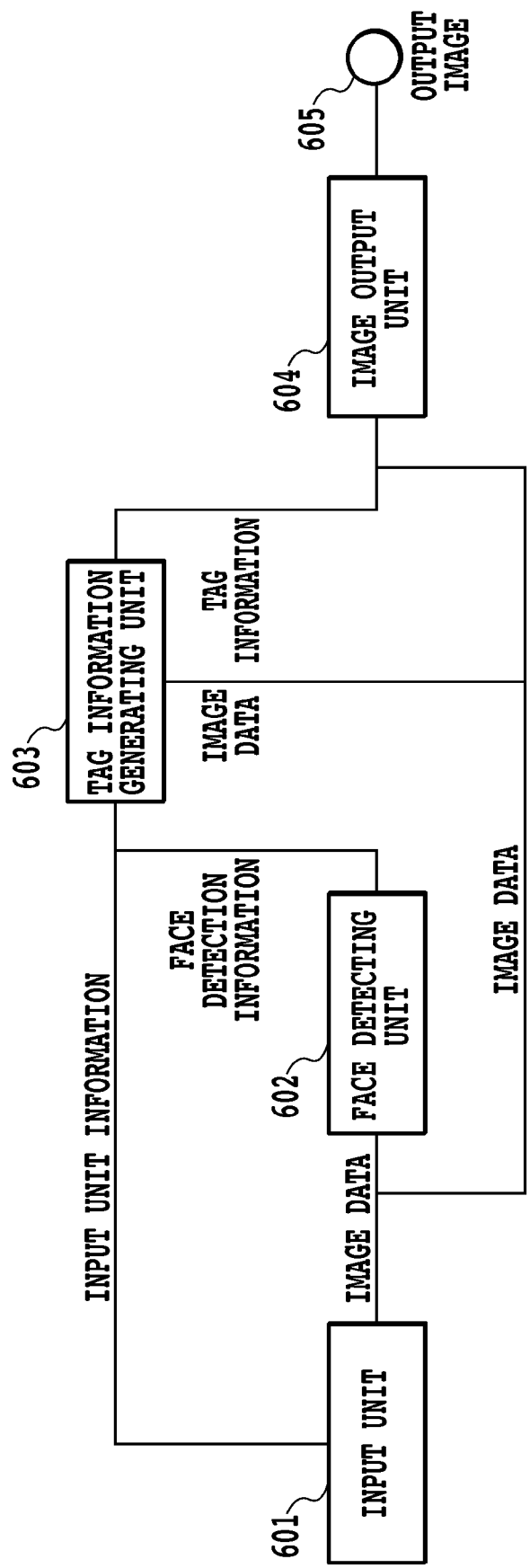
FIG. 6 is a diagram for explanation of an image processing apparatus in Embodiment 1.

FIG. 6 shows a series of processings from when tag information is added to image data obtained by an input device such as a digital camera until an output image is created. Here, the input device is a digital camera for simplifying the explanation. However, the input device may be another device such as a scanner. Further, in the present embodiment, face detection is described as part of the processings. However, detection other than face detection may be described therein.

The input device is composed of an input unit 601, a face detecting unit 602, a tag information generating unit 603, and an image output unit 604.

The input unit 601 converts data photographed by an image-taking element such as a CCD into image data. The photographed data is output as the image data. Moreover, photographed information on photographing such as photographing date and time, a model name, a shutter speed, and an aperture setting are output as input unit information by the input device.

The input unit 601 is connected to the face detecting unit 602, the tag information generating unit 603, and the image output unit 604.

The face detecting unit 602 judges whether or not a face area is included in the image data created by the input unit 601.

As a face detecting method of the face detecting unit 602, a face area may be detected by any technique of a technique utilizing pattern matching and a technique utilizing learning data through a neural network which have already been proposed.

Figure 11:
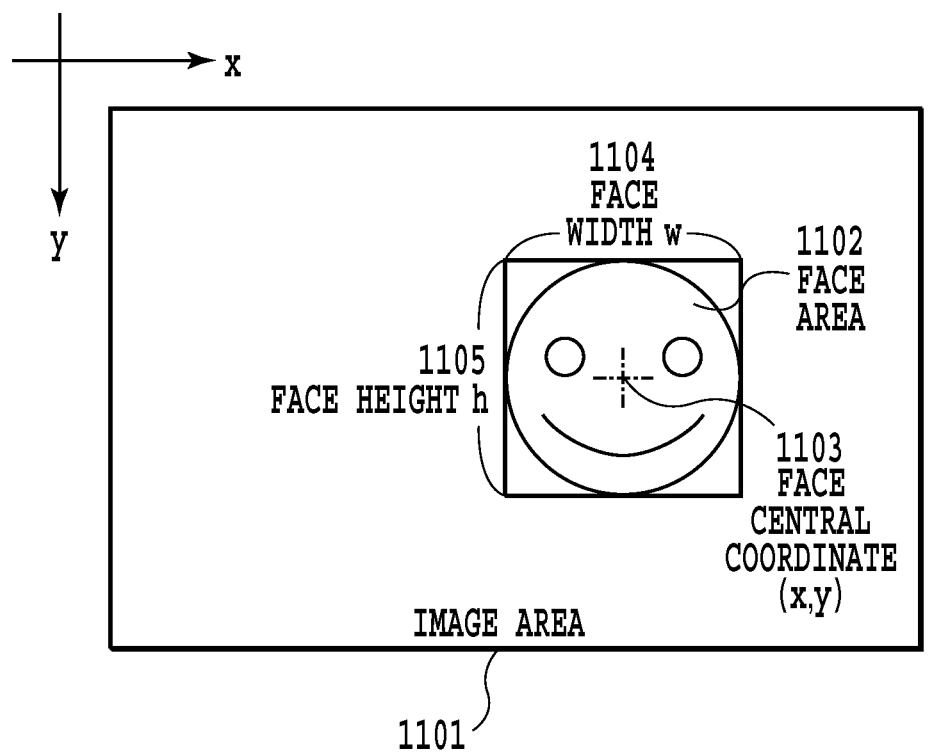
FIG. 11 is an explanatory diagram of face information included in tag information.
Figure 12:
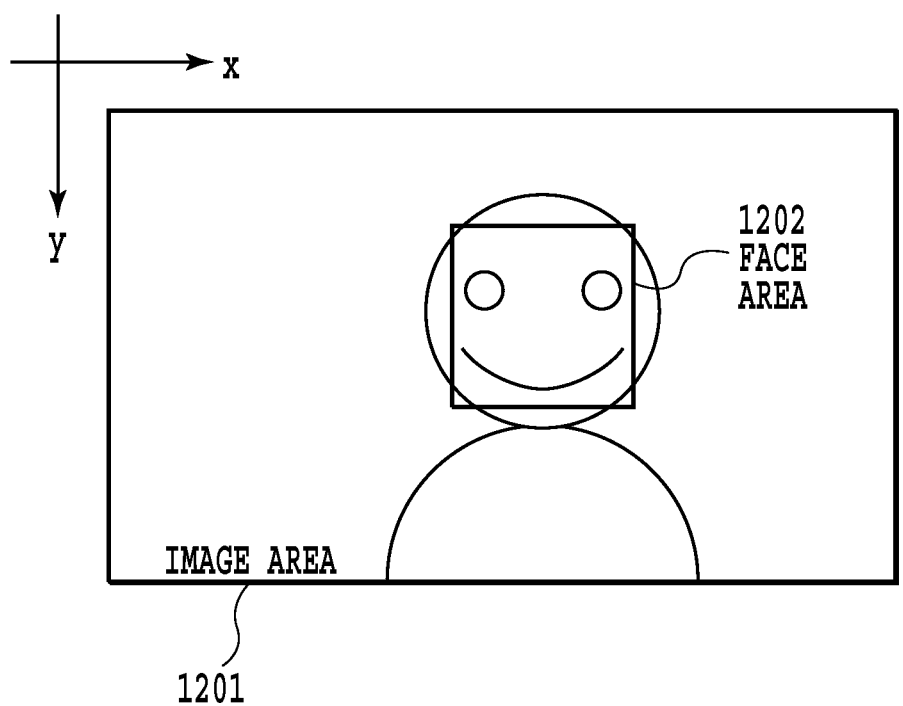
FIG. 12 is a diagram showing an example of a face area.
Figure 13:
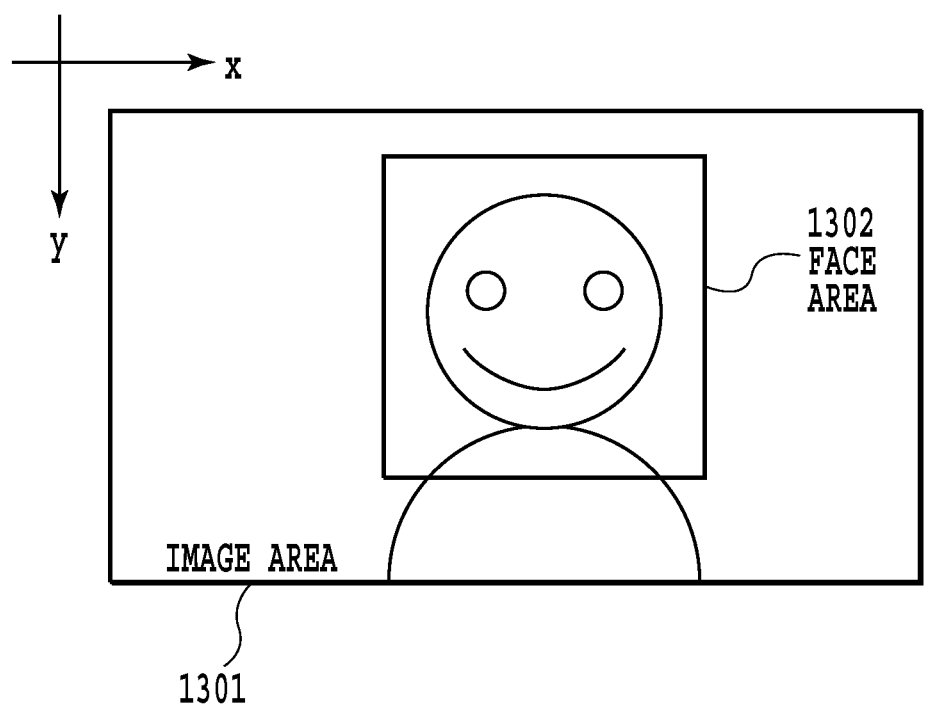
FIG. 13 is a diagram showing an example of a face area.

FIG. 11 is a diagram for explanation of face detection results. Face detection within an image area 1101 is performed by arbitrary algorithms. When a face a real 102 is detected within the image area 1101, a central coordinate of the face area (a face central coordinate 1103), a width of the face area (a face width w 1104), and a height of the face area (a face height h 1105) are output as face detection results. Additionally, a rotation angle may be output as a face detection result.

The face detecting unit 602 in FIG. 6 outputs the central coordinate 1103, the width 1104, and the height 1105 of the face area described above, as detection results.

The tag information generating unit 603 is a unit creating tag information to be added to the image data. Tag information will be herein after described with reference to FIG. 10.

Figure 10:
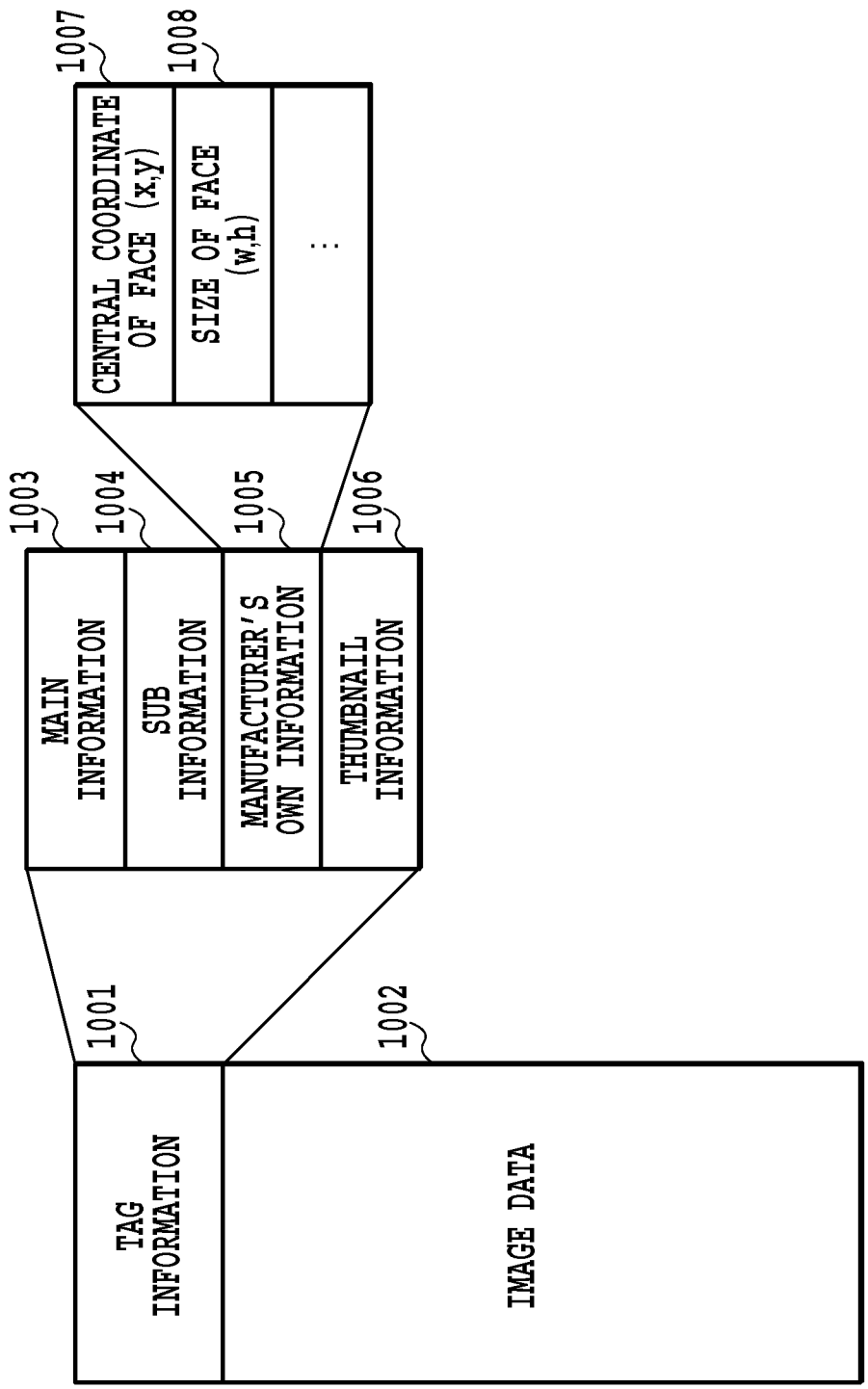
FIG. 10 is an explanatory diagram of tag information.

FIG. 10 shows a data structure of output image data. As shown in FIG. 10, the output image data has tag information 1001 and image data 1002.

Image data photographed by an input device is stored in the image data 1002. The tag information 1001 has main information 1003, sub information 1004, manufacturer's own information 1005, and thumbnail information 1006.

Information on photographing is stored in the main information 1003. Here, the information on photographing may be photographing date and time and a model name.

An image compression mode, a color space, and a number of pixels are stored in the sub information 1004.

Information uniquely output by an input device development manufacturer is stored in the manufacturer's own information 1005.

A reduced-size image created from the photographed image data is stored as an image for preview in the thumbnail information 1006.

Face detection results are stored in the manufacturer's own information 1005. A face central coordinate 1007 and a face size 1008 serving as face detection results may be stored in the manufacturer's own information 1005.

The tag information generating unit 603 in FIG. 6 creates information corresponding to the tag information 1001 in FIG. 10. The main information 1003 and the sub information 1004 in FIG. 10 are set on the basis of the input unit information output from the input unit 601 in FIG. 6. The manufacturer's own information 1005 in FIG. 10 is set on the basis of the face detection information output from the face detecting unit 602 in FIG. 6. The thumbnail information 1006 in FIG. 10 is set on the basis of the image data output from the input unit 601 in FIG. 6.

The tag information created by setting those information is output from the tag information generating unit 603 in FIG. 6.

The image output unit 604 in FIG. 6 creates an image to be finally output to output it. The image output unit 604 is connected to the input unit 601 and the tag information generating unit 603.

The image output unit 604 creates an output image 605 by combining the tag information created by the tag information generating unit 603 and the image data output from the input unit 601, and outputs the output image 605.

The input device in Embodiment 1 has been described above.

Figure 4:
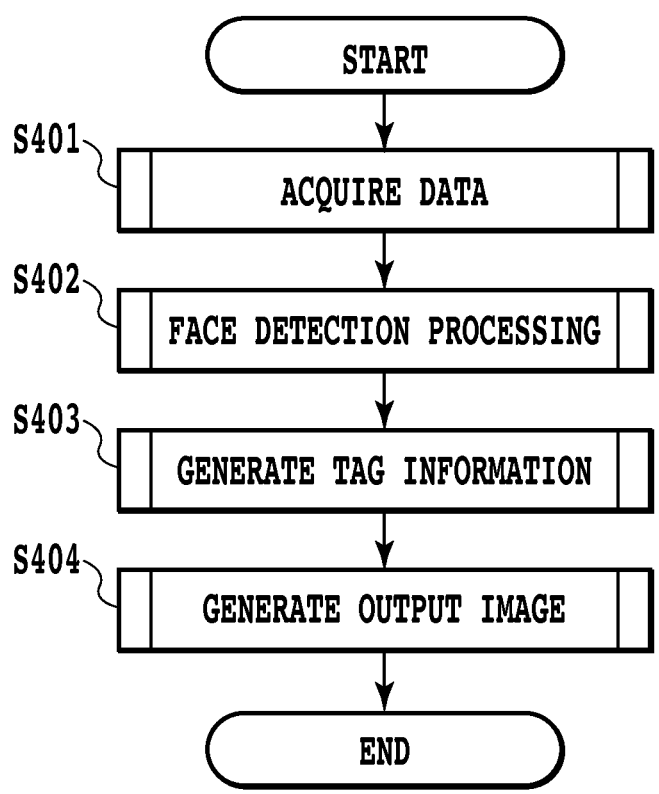
FIG. 4 is a flowchart for creating an image in Embodiment 1.

An operation procedure of the input device described above will be described with reference to FIG. 4. FIG. 4 is a processing flowchart of the input device.

First, at step S401 in FIG. 4, the input unit 601 in FIG. 6 acquires input unit information and image data.

Next, at step S402, the face detecting unit 602 executes face detection processing with respect to the acquired image data to acquire face detection information.

Next, at step S403, the tag information generating unit 603 generates a thumbnail image on the basis of the input unit information, the face detection information, and the image data, and generates tag information on the basis of those information.

Next, at step S404, the image output unit 604 combines the generated tag information and image data to form an output image.

The output image is created through the flow of these series of processings.

Next, the printing apparatus in Embodiment 1 will be described. The printing apparatus is an apparatus that prints an image created by the input device.

Figure 7:
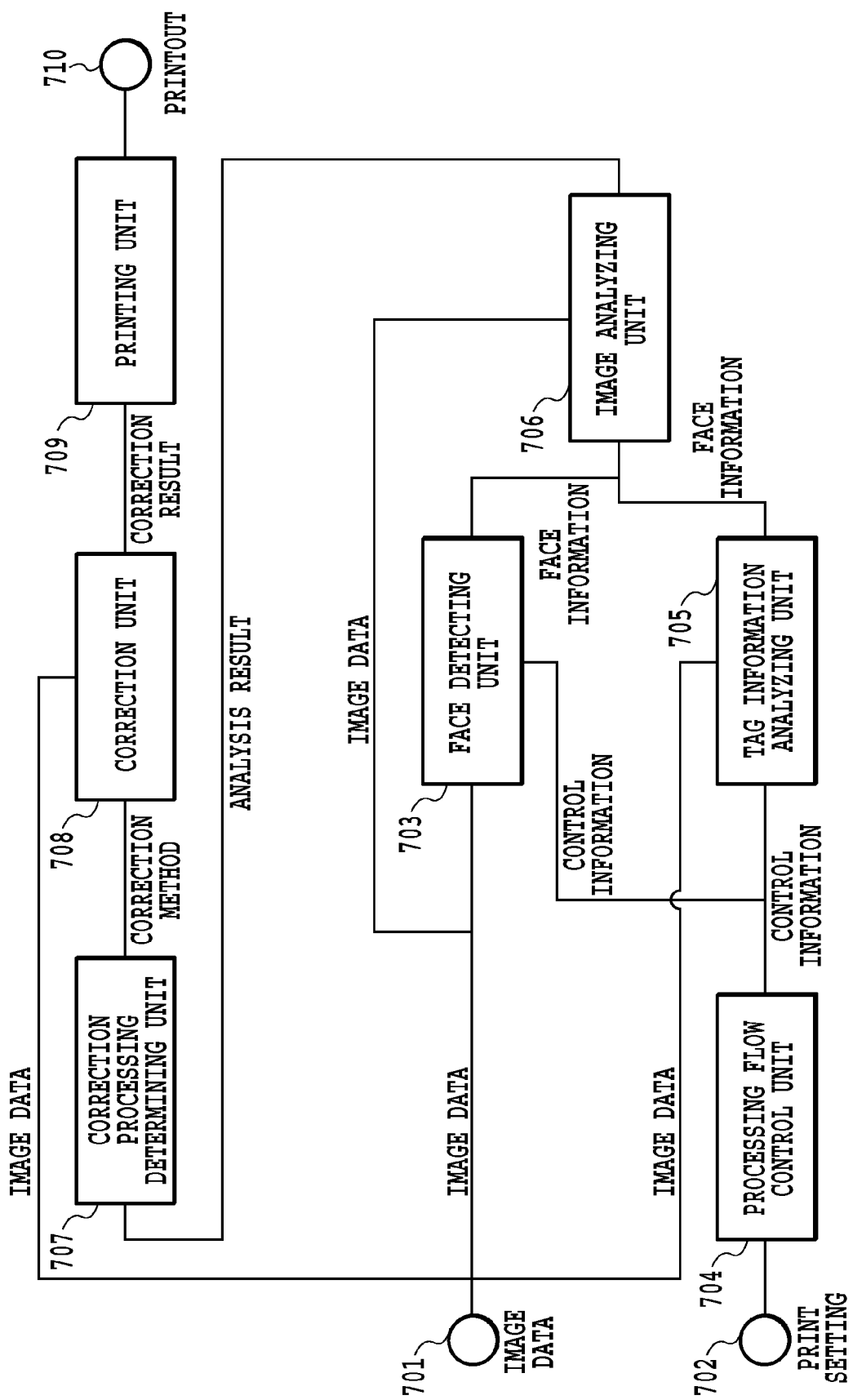
FIG. 7 is a diagram for explanation of an image processing apparatus in Embodiment 1.

FIG. 7 is a diagram showing a series of configurations when image data created by the input device is printed by a printing apparatus such as a printer.

A processing flow control unit 704 in FIG. 7 controls a printing flow when input image data 701 is printed. A print setting 702 is input to the processing flow control unit 704. The print setting 702 is a setting when the input image data 701 is printed, and printing quality, a type of sheet, and the like are set through a user interface.

A case in which printing quality is set in the print setting 702 will be specifically described. Another print setting or a combination of a plurality of print settings may be set in the print setting 702.

The processing flow control unit 704 outputs control information on the processing flow on the basis of the print setting 702. When the printing quality is set to "quick" in the print setting 702, a processing flow in which face detection results included in tag information of image data are used, is selected. In this way, utilizing face detection results in tag information enables to shorten a processing time as compared with a case in which face detection processing is executed by the face detecting unit 703. That is, when both of the input device and the printing apparatus have face detecting functions, utilizing face detection results by the input device enables to shorten a processing time.

Further, when the printing quality is set to other than "quick" in the print setting 702, a processing flow in which the face detecting unit 703 included in the printing apparatus is utilized, is selected. When the printing quality is set to other than "quick," it is judged that a user places great importance on image quality, and a processing flow in which face detection results by the face detecting unit 703 are utilized, is selected.

The detailed reason for that a processing flow in which face detection results by the face detecting unit 703 are utilized, is selected when a user places great importance on image quality, will be described later. However, a brief description is as follows. That is, with respect to face information included in tag information, a definition of face area is ambiguous depending on manufacturers, which makes it impossible to perform accurate analysis processing at the time of performing correction processing. In contrast thereto, because a definition of face area is clear in the face detecting unit 703 in the printing apparatus, accurate analysis processing is possible, which makes it possible to realize optimum correction processing as a result.

When a flow in which face detection results included in tag information of image data are used, is selected by the processing flow control unit 704, the tag information analysis unit 705 analyzes a header part in the input image data 701 to output the face detection results detected by the input device described above.

When a flow in which face detection is performed by utilizing the face detecting unit 703 in the printing apparatus, is selected by the processing flow control unit 704, the face detecting unit 703 executes face detection processing with respect to the input image data 701 to output the face detection results.

The face detecting unit 703 in the printing apparatus executes face detection processing suitable for image correction to be finally performed. For example, detection results when face detection is performed may be denoted by reliability, and its correction intensity may be modified in accordance with the reliability. When the reliability is high, the correction intensity is set to be high, and as the reliability comes to be lower, the correction intensity may be set to be lower. Further, other information obtained by detection functions other than a face detecting function, of organ detection, red-eye detection, and the like may be output as information of face detection results.

The image analysis unit 706 performs analysis processing of the input image data 701. First, the image analysis unit 706 calculates a feature quantity of the image on the basis of a histogram and the like of the image data 701. Then, the image analysis unit 706 combines face detection results output from the face detecting unit 703 or the tag information analysis unit 705 with the feature quantity to perform analysis of the image data 701.

Figure 14:
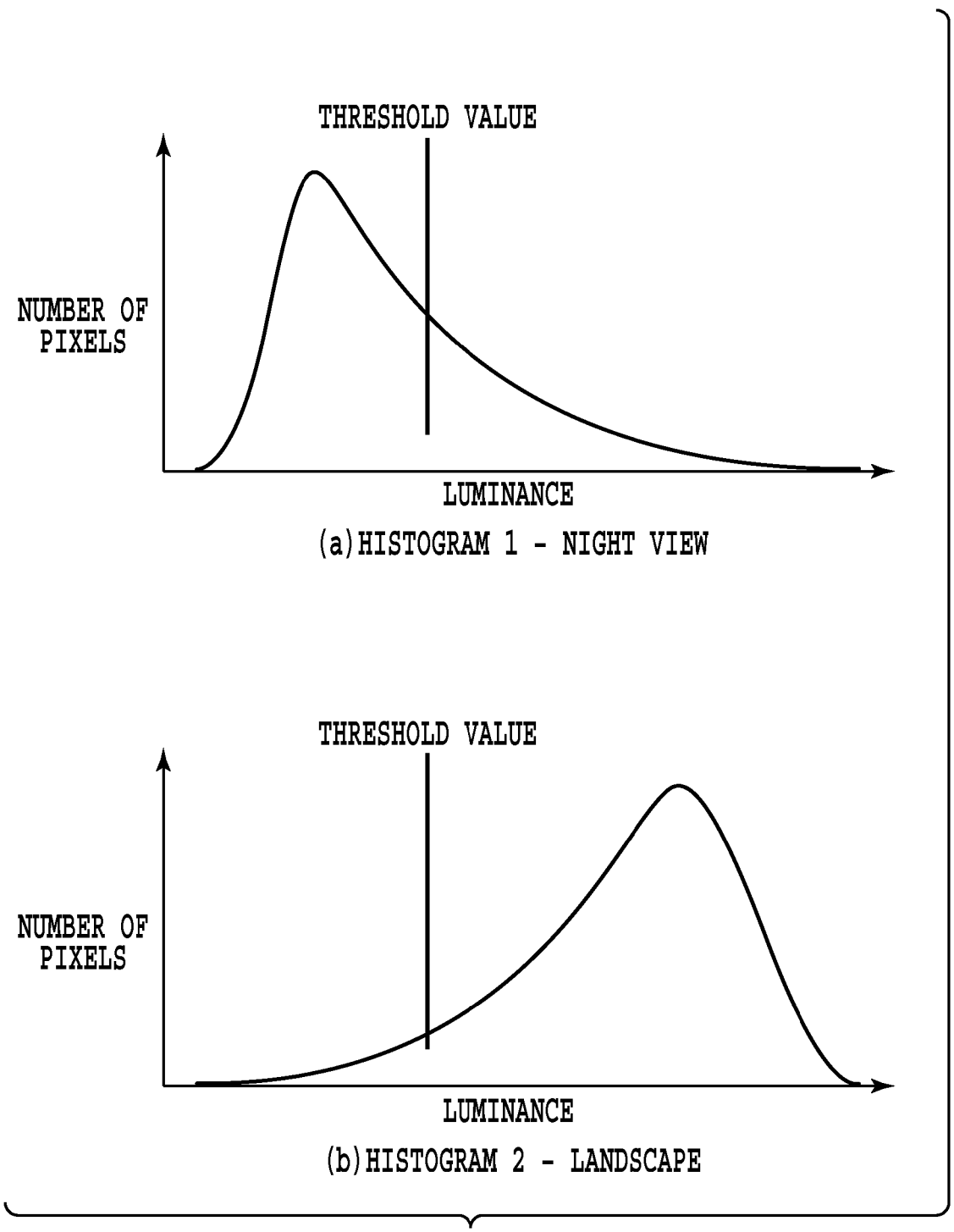
FIG. 14 is graph showing histograms in Embodiment 1.

For example, the image analysis unit 706 may prepare a histogram of a luminance component in the image data 701 for analysis thereof. The analysis of the histogram may be performed as follows. For example, when a result of the prepared histogram is as that in FIG. 14(*a*), because a peak in the distribution is located at the luminance lower than the threshold value, the image analysis unit 706 judges that the image is a night view. Further, when a result of the prepared histogram is as that in FIG. 14(*b*), because a peak in the distribution is located at the luminance higher than the threshold value, the image analysis unit 706 judges that the image is a landscape.

The image analysis unit 706 in FIG. 7 may combine a result of the judgment on the histogram with the face detection results to perform further detailed analysis. For example, when there is a face in a "night view," the image analysis unit 706 may judge that the image is a "snapshot night view." Further, when there is no face in a "night view," the image analysis unit 706 may judge that the image is a "night view." Further, when there is a face in a "landscape," the image analysis unit 706 may judge that the image is a "snapshot landscape." Further, when there is no face in a "landscape," the image analysis unit 706 may judge that the image is a "landscape."

Further, the image analysis unit 706 in FIG. 7 may use not only histogram analysis, but also statistical analysis, frequency analysis, and binarized or multi-valued logic analysis to perform analysis.

A correction processing determining unit 707 determines correction processing optimum for the input image data 701. The correction processing determining unit 707 prepares correction tables corresponding to the above-described scenes in advance, and selects a correction table to be used in accordance with an analysis result of the image analysis unit 706.

The correction unit 708 executes correction processing with respect to the input image data 701. The correction unit 708 performs correction processing with respect to the image data 701 by utilizing a correction table determined by the correction processing determining unit 707.

In a case in which a face area is included in the input image area, the correction unit 708 performs correction with respect to the face area as follows. First, the correction unit 708 calculates average color saturation and average hue in the face area. Then, the correction unit 708 calculates differences between the calculated average color saturation and hue and the color saturation and hue for an optimum skin color determined in advance. Then, the correction unit 708 sets the determined color saturation difference and hue difference as correction factors, and adjusts the color saturation and hue in the face area on the basis of the correction factors.

Here, the technique in which an entire image is corrected in accordance with a correction table and color saturation and hue in a face area in the corrected image area are adjusted has been described for the purpose of illustration. However, the correction unit 708 may perform correction processing maintaining balance between the face area and its background by a well-known technique.

With respect to face detection with tag information, because there are a variety of definitions of face area depending on manufacturers, when a definition of face area is different from an estimated definition of face area when the correction unit 708 performs correction processing, average color saturation and hue in the face area are shifted, which may make an optimum skin color area determined in advance invalid in some cases. On the other hand, when face detection results in the printing apparatus are utilized, a definition of face area matches with an estimated definition of face area, which makes an optimum skin color area determined in advance valid. In accordance therewith, when great importance is placed on correction processing, it is more effective to utilize face detection results in the printing apparatus.

The correction unit 708 executes correction processing with respect to the image data 701, to output image data as a correction result. A printing unit 709 prints the image data onto which correction processing has been performed, to output a printout 710.

Figure 5:
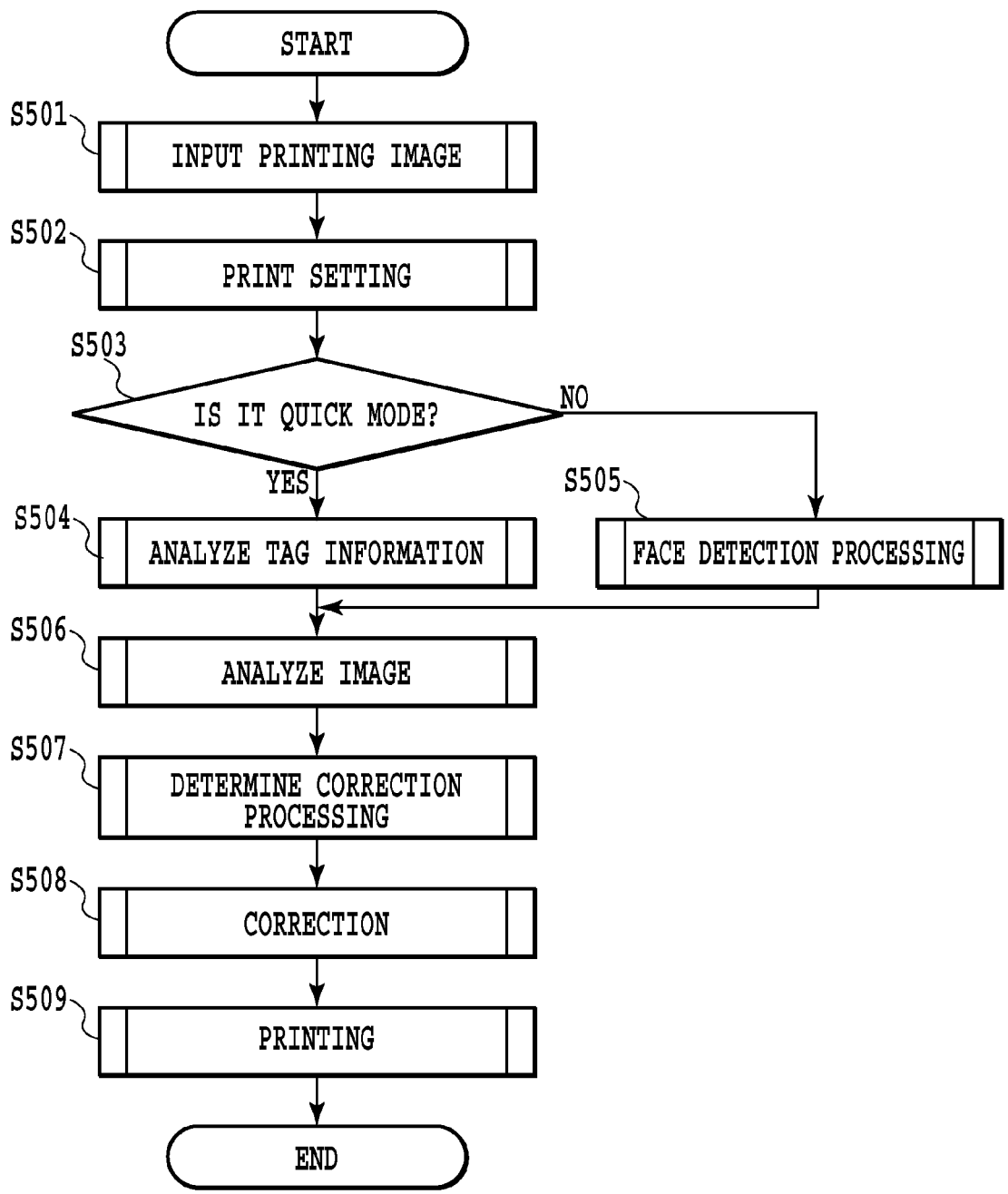
FIG. 5 is a flowchart for printing an image in Embodiment 1.

The operation procedure of the printing apparatus having the above-described configuration will be described. FIG. 5 is a chart showing a processing flow of the printing apparatus. The processings shown in FIG. 5 may be executed by the CPU 102 of the printing apparatus 101. In detail, a program for executing the flowchart of FIG. 5 is stored in the ROM 103 or the RAM 104, and the CPU 102 reads out the stored program and executes the program, to execute the flowchart of FIG. 5.

First, at step S501, an image to be printed is selected, and an input of the image data 701 is received. At step S501, the image data and tag information added to the image data are acquired from an input device such as a digital camera.

Next, at step S502, the print setting 702 for printing the image data 701 is set. The print setting 702 is set such that the printing quality is "fine," "quick," or the like with respect to the image data 701.

Next, at step S503, the processing flow control unit 704 analyzes the set print setting 702, to determine a processing flow. Here, only the printing quality is focused on, and the processing flow control unit 704 judges whether "fine" or "quick" is selected as the printing quality.

When it is judged that the printing quality is set to "quick," i.e., a print setting placing great importance on speed is set at step S503, the processing proceeds to step S504.

At step S504, the tag information analysis unit 705 analyzes the tag information included in the image data, to extract face detection information. Then, the processing proceeds to step S506.

When it is judged that the printing quality is not set to "quick," i.e., the printing quality is set to "fine" (a print setting placing great importance on image quality) at step S503, the processing proceeds to step S505.

At step S505, the face detecting unit 703 in the printing apparatus executes face detection processing in the input image area, to output a central coordinate and a size of the face area detected by the face detection processing.

Next, at step S506, the image analysis unit 706 analyzes the output face information and image data, to determine a scene of the input image. The face information used at step S506 differs depending on the quality of print setting. Then, at step S506, a histogram is prepared on the basis of the input image, and classification of a scene is carried out on the basis of its distribution in the histogram. The scene is further classified in accordance with the presence or absence of a face on the basis of the result of the classification.

Next, at step S507, the correction processing determining unit 707 determines correction processing on the basis of a result of the scene analyzed by the image analysis unit 706. Here, a correction table prepared in advance is selected in accordance with a result of the classification of a scene.

Next, at step S508, the correction unit 708 executes the correction processing with respect to the image data by utilizing the correction table selected on the basis of the correction processing determined by the correction processing determining unit 707.

Next, at step S509, the printing unit 709 prints the image data corrected by the correction unit 708 on a paper surface.

Embodiment 1 has been described above. In this way, provided that a processing flow is controlled in accordance with printing quality, it is possible to provide an optimum printing apparatus taking into consideration the balance between speed and image quality.

Embodiment 2

Hereinafter, a printing apparatus in Embodiment 2 according to the present invention will be described. A method for switching a face detection result to be used in accordance with a number of sheets of printing images will be described for Embodiment 2. In addition, in the present embodiment, configurations which are the same as those in Embodiment 1 are denoted by the same reference numerals, and descriptions thereof will be omitted.

Figure 9:
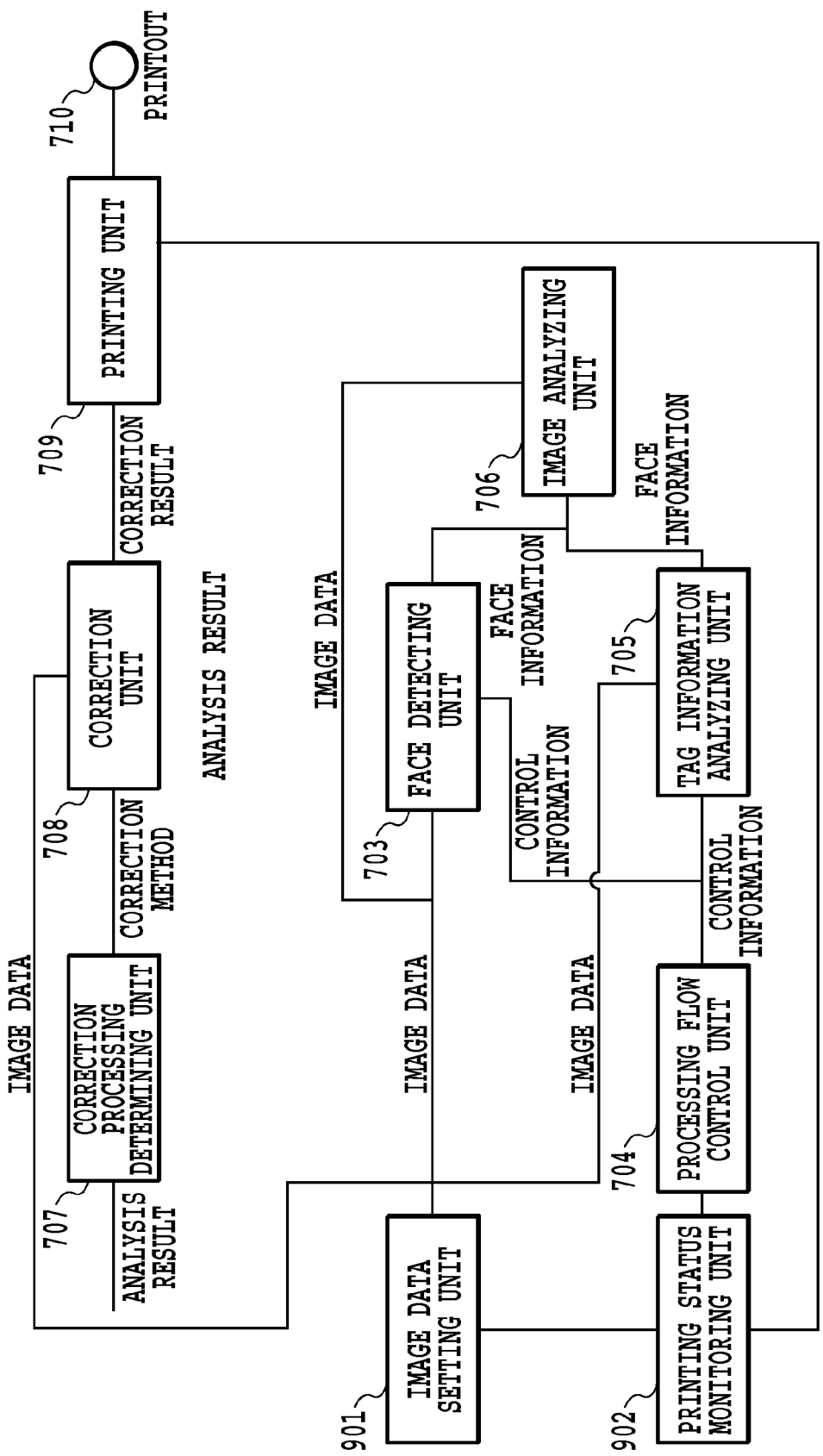
FIG. 9 is a diagram for explanation of an image processing apparatus in Embodiment 2.

FIG. 9 is a block diagram showing the printing apparatus of Embodiment 2.

Embodiment 2 is based on Embodiment 1, that controls a printing flow in accordance with an order of printing when a plurality of sheets are printed. Here, images to be printed are images created by the printing apparatus of Embodiment 1.

An image data setting unit 901 in FIG. 9 sets printing image data selected by a user. First, the images selected by the user and a number of sheets thereof to be printed are prepared as a list. It is assumed that a plurality of sheets of different images are selected for purposes of illustration.

A printing status monitoring unit 902 monitors a current printing job on the basis of the list prepared by the image data setting unit 901.

A processing flow control unit 704 controls the following processing flow in accordance with a monitoring result of the printing status monitoring unit 902. Here, a case in which the processing flow is controlled in accordance with an order of printing will be described for purposes of illustration.

For example, in a case in which a plurality of sheets of different images are printed, provided that image processing is executed with respect to the second image while printing the first image, efficient printing can be performed. Therefore, in view of the type of usage of a user, it is necessary for a time for the first image to be shorter than a time for the second image or later.

The printing status monitoring unit 902 monitors what number sheet is currently printed, and when the first sheet is currently printed, the printing status monitoring unit 902 outputs the information thereon to the processing flow control unit 704. Then, extracting face information from the tag information enables to greatly reduce the processing load as compared with a case in which face detection is performed by the face detecting unit 703.

However, as described in Embodiment 1 as well, the face information included in the tag information includes unknown factors, and a result of the correction processing may be inferior to that in a case in which the face detecting function in the printing apparatus is utilized.

Then, correction processing is performed with respect to the second sheet or later having a processing time greater than that for the first sheet by utilizing face information utilizing the face detecting unit 703 in the printing apparatus, which makes optimum correction processing possible.

In this way, provided that face information to be utilized is controlled in accordance with an order of printing, it is possible to realize an optimum image processing apparatus taking into consideration the balance between image quality and speed.

Figure 8:
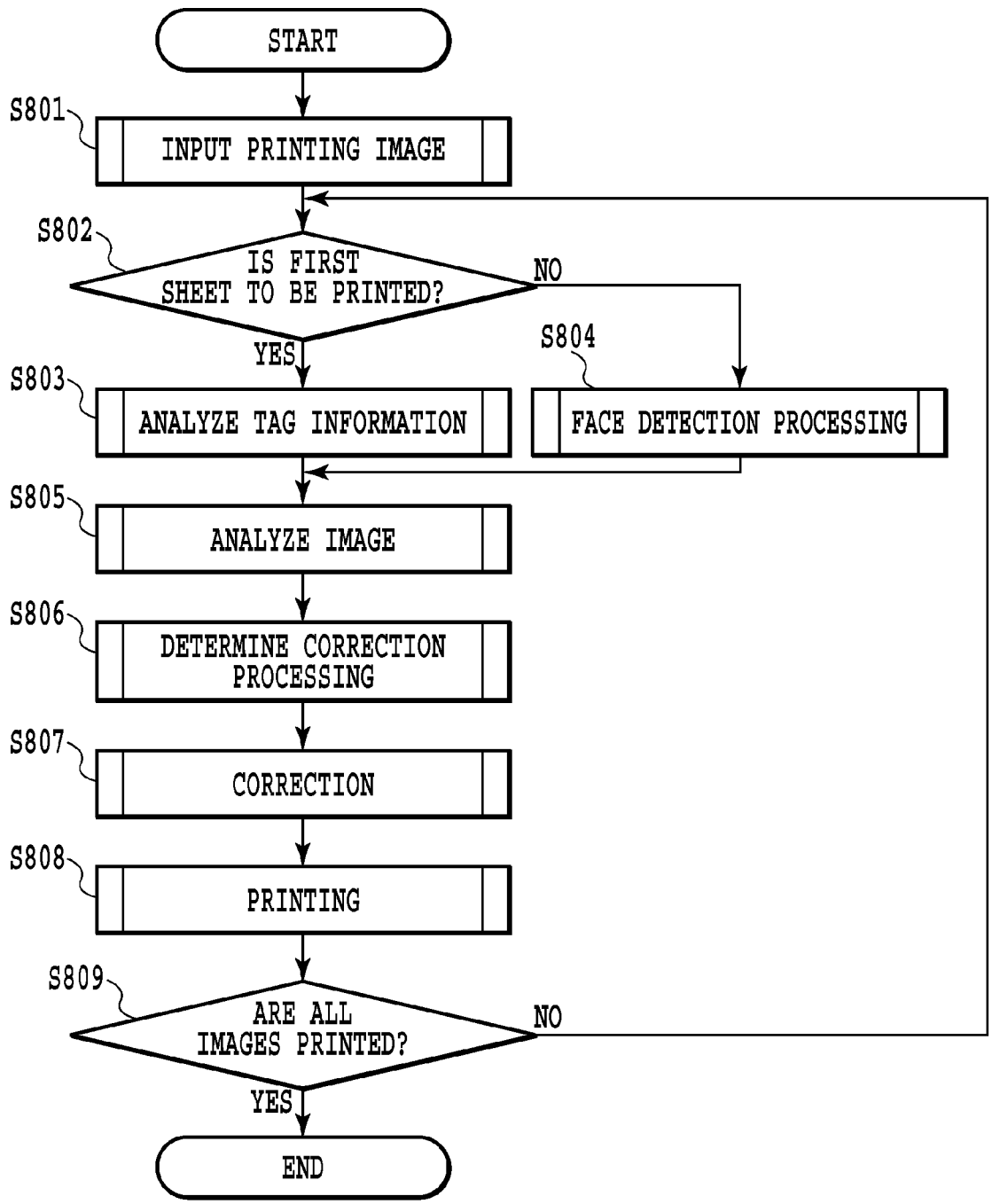
FIG. 8 is a flow chart for printing images in Embodiment 2.

Next, the operation procedure of the printing apparatus having the above-described configuration will be described with reference to FIG. 8. The processings shown in FIG. 8 may be executed by the CPU 102 of the printing apparatus 101. In detail, a program for executing the flowchart of FIG. 8 is stored in the ROM 103 or the RAM 104, and the CPU 102 reads out the stored program to execute the program, to execute the flowchart of FIG. 8. First, at step S801 in FIG. 8, the image data setting unit 901 receives an input of a printing image selected by a user.

Next, what number sheet is currently printed is counted by the printing status monitoring unit 902. This count is to monitor a printing status on the basis of the information input by the image data setting unit 901. Thereby, the printing status monitoring unit 902 is capable of figuring out what number sheet of an image to be printed is.

Next, at step S802, the processing flow control unit 704 modifies the following processing flow on the basis of the information output from the printing status monitoring unit 902. Here, when it is judged that the image to be printed is the first sheet at step S802, the processing proceeds to step S803, and the tag information analysis unit 705 executes tag information analysis.

When it is judged that the image to be printed is not the first sheet, but the second sheet or later at step S802, the face detecting unit 703 executes face detection processing.

Hereinafter, because steps S803 to S808 are the same processings as those at steps S504 to S509 in FIG. 5 described in Embodiment 1, descriptions thereof will be omitted.

At step S809 in FIG. 8, the printing status monitoring unit 902 monitors a status of the printing unit 709, and when it is sensed that the printing is completed, the printing status monitoring unit 902 judges whether or not all the images have been printed.

When it is judged that all the images have been printed at step S809, the processing is completed.

On the other hand, when it is judged that all the images have not been printed at step S809, the processing proceeds to step S802.

Provided that the processing flow is controlled in accordance with an order of printing by the flow of the series of processings, it is possible to realize a printing apparatus taking into consideration the balance between image quality and speed.

Here, the example in which the processing flow is controlled in accordance with a number of sheets to be printed has been described. However, the processing flow may be controlled in accordance with a status of a printing job of the printing apparatus in the same way. In a case in which many printing jobs are activated, the load on the printing apparatus is reduced by utilizing face detection results included in the tag information, to be able to enhance its printing throughput.

Embodiment 3

Hereinafter, a printing apparatus in Embodiment 3 according to the present invention will be described. A method for setting an order of priority of which one is prioritized when a combination of priority on image quality and priority on speed contradict each other is set by the print setting, will be described as Embodiment 3. In addition, in the present embodiment, configurations which are the same as those in Embodiment 1 are denoted by the same reference numerals, and descriptions thereof will be omitted.

Figure 16:
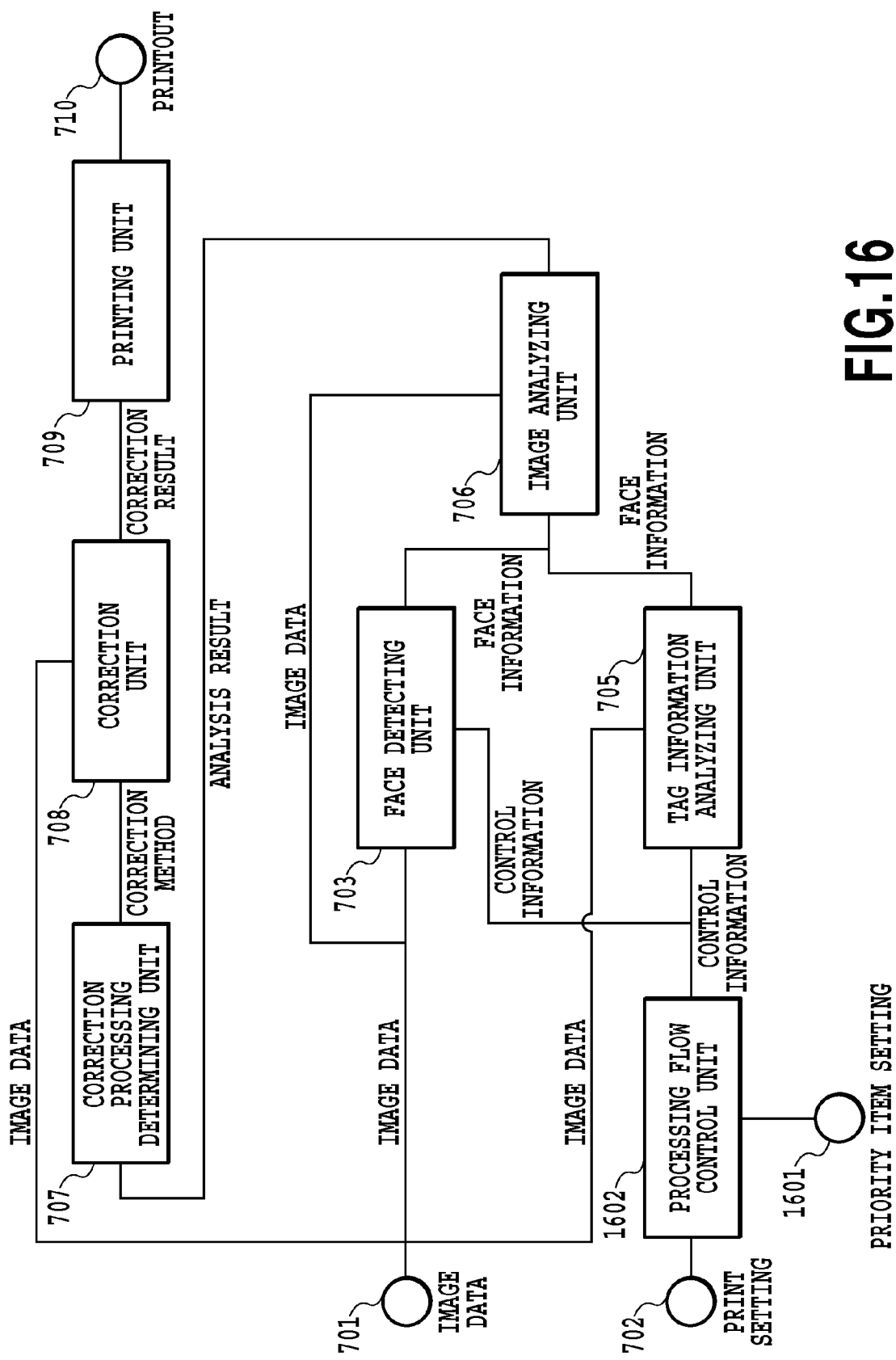
FIG. 16 is a diagram for explanation of an image processing apparatus in Embodiment 3.

FIG. 16 is a block diagram showing the printing apparatus of Embodiment 3.

A priority item setting 1601 is a setting for priority on image quality or priority on speed. The setting method will be described with reference to FIG. 17.

Figure 17:
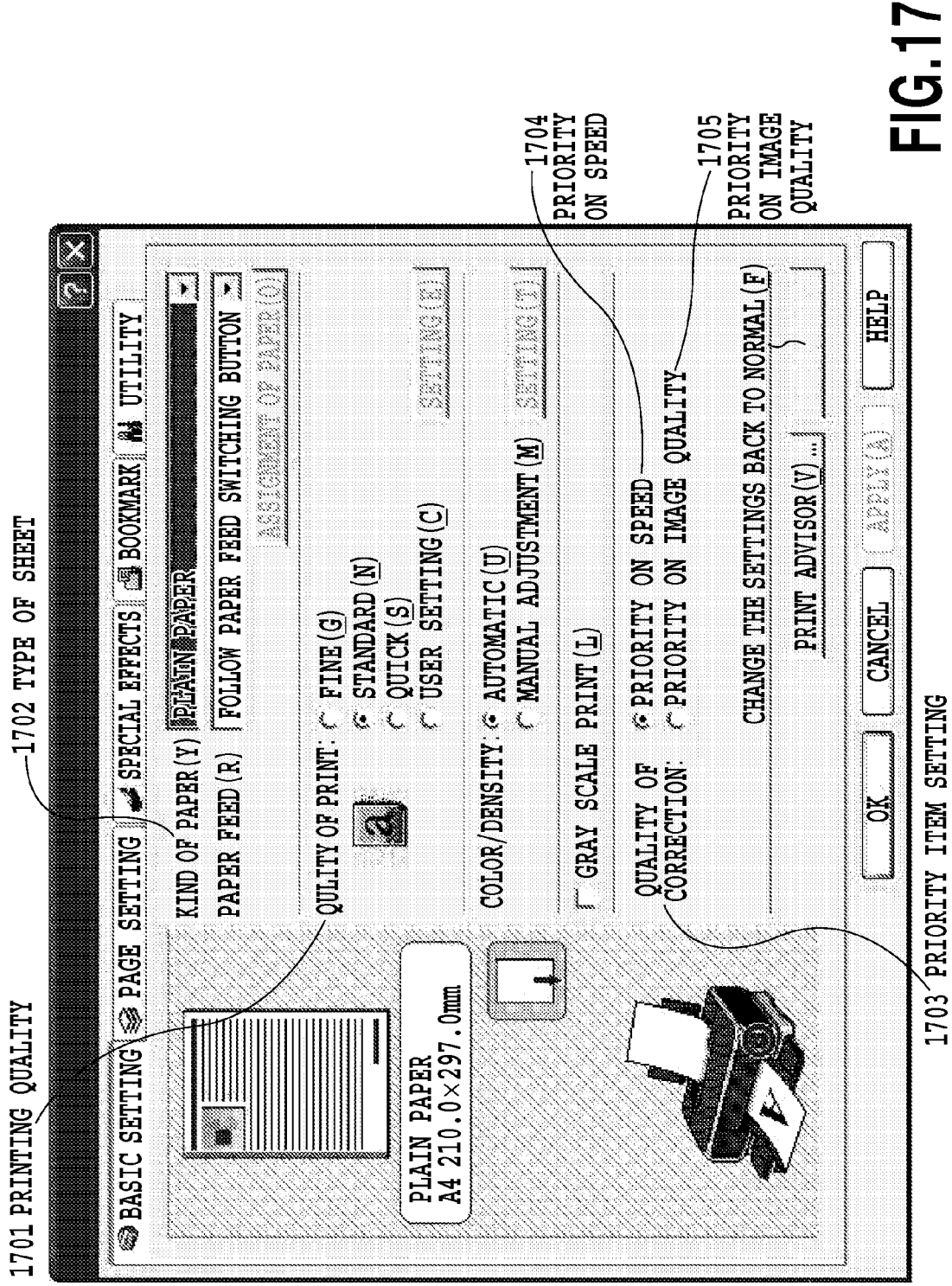
FIG. 17 is a view showing a UI (user interface) for setting a priority item.

FIG. 17 shows an example of a UI (user interface) for configuring print settings. A printing quality 1701 is to set printing quality. There are "fine," "standard," "quick," and "user setting" as the printing quality. On "fine" and "standard," a flow in which correction placing priority on image quality is performed is set. On "quick," a flow in which correction placing priority on speed is performed is set. On "user setting," the priority on image quality and the priority on speed are automatically switched in accordance with details set by a user.

A type of sheet 1702 is to set a printing sheet. "Plain paper," "photo sheet," and the like are set in the printing sheet. On "photo sheet," a flow in which correction placing priority on image quality is performed is set. On the other sheets, a flow in which correction placing priority on speed is performed is set.

In the same way, the settings for the printing quality may include settings of printing colors, print densities, double-side printing, and the presence or absence of special effects.

A priority item setting 1703 is to set a priority item at the time of correction. In a case in which priority on speed 1704 is set, when there is a contradiction in the policy of correction processing on the basis of the details of settings for the printing quality 1701 and the type of sheet 1702, correction placing priority on speed is performed. In a case in which priority on image quality 1705 is set, when there is a contradiction in the policy of correction processing on the basis of the details of settings for the printing quality 1701 and the type of sheet 1702, correction placing priority on image quality is performed.

The details set by the UI (user interface) in FIG. 17 are input to a processing flow control unit 1602 in FIG. 16. The set details are the print setting 702 and the priority item setting 1601. The print setting is the above-described printing quality and type of sheet. The priority items are priority items at the time of correction as described above. These items are input to the processing flow control unit 1602, to set the following processing flow.

The set priority items are for the purpose of switching face detection results used at the time of performing correction processing, and not to change a type of sheet or process control in printing.

In this way, in a case in which setting items for judging a processing flow contradict each other in the embodiment in which a processing flow is controlled by print settings, a processing flow to be controlled is set on the basis of priority items set by a user, to be able to realize an optimum printing system.

Figure 15:
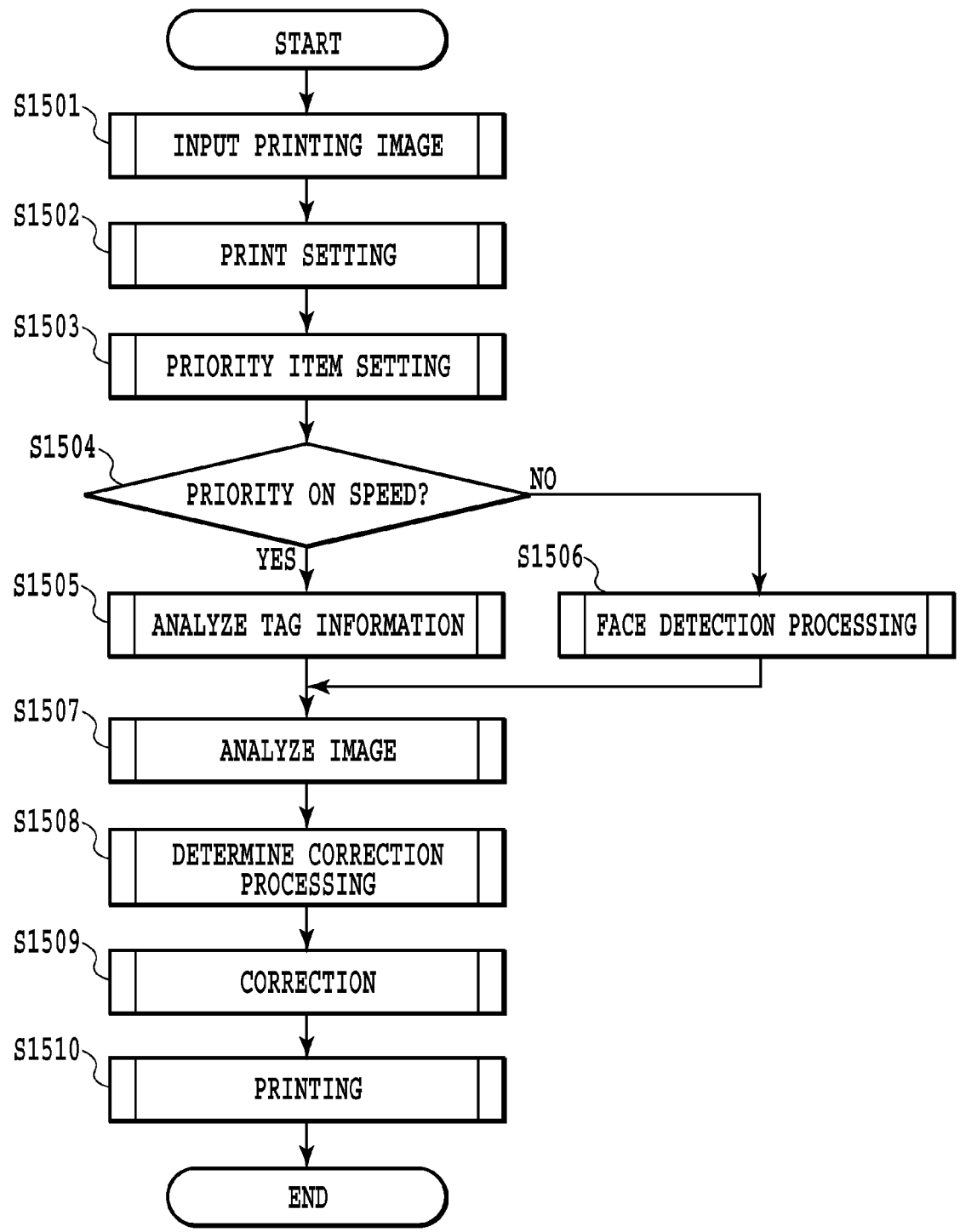
FIG. 15 is a flowchart for printing an image in Embodiment 3.

Next, the operation procedure of the printing apparatus having the above-described configuration will be described. FIG. 15 is a chart showing a processing flow of the printing apparatus. The processings shown in FIG. 15 may be executed by the CPU 102 of the printing apparatus 101. In detail, a program for executing the flowchart of FIG. 15 is stored in the ROM 103 or the RAM 104, and the CPU 102 reads out the stored program to execute the program, to execute the flowchart of FIG. 15.

First, at step S1501 in FIG. 15, an input of the image data 701 of a printing image selected by a user is received.

Next, at step S1502, the print setting 702 for printing the selected image is set.

Next, at step S1503, the priority item setting 1601 is received.

Next, at step S1504, the processing flow control unit 1602 determines the following processing flow in a comprehensive manner in accordance with the results of the input print setting 702 and the priority item setting 1601.

In detail, at step S1504, it is judged whether or not the setting for printing quality and the setting for printing sheet contradict each other, and speed is set as a priority item.

When it is judged that speed is set as a priority item at step S1504, the processing proceeds to step S1505.

On the other hand, when it is judged that speed is not set as a priority item at step S1504, the processing proceeds to step S1506.

Because the processing flow at S1505 or later is the same as the processings at S504 or later in FIG. 5, the following descriptions thereof will be omitted.

Embodiment 3 has been described above. Provided that a processing flow is controlled by print settings and priority item settings in this way, it is possible to provide an optimum image processing apparatus in which a user's intention is reflected.

Other Embodiments

The present invention can be further applied to a system composed of a plurality of devices (for example, a computer, an interface device, a reader, a printing apparatus, and the like), or an apparatus composed of one device (such as a multifunctional peripheral, a printing apparatus, or a facsimile apparatus).

Further, the object of the present invention can be achieved such that a computer (or a CPU or an MPU) in a system or an apparatus reads out the program code to execute it from a storage medium on which a program code for realizing the procedure of the flowchart shown in the above-described embodiments is stored. In this case, the program code itself read out of the storage medium realizes the functions in the above-described embodiments. Therefore, the program code and the computer-readable storage medium on which the program code is stored and recorded as well are configured as the present invention.

As the storage medium to supply the program code, for example, a floppy (registered mark) disk, a hard disk, an optical disk, a magnetic optical disk, a CD-ROM, a CD-R, a magnetic tape, a nonvolatile memory card, a ROM, or the like can be used.

Further, the functions of the above-described embodiments are realized due to a computer executing the read program. Further, the execution of the program includes a case in which an OS or the like operating on the computer on the basis of an instruction from the program executes some of or all of the actual processings.

Moreover, the functions of the above-described embodiments can be realized by an extension board inserted into a computer or an extension unit connected to a computer as well. In this case, first, a program read out of a storage medium is written into a memory provided to an extension board inserted into a computer or an extension unit connected to a computer. Thereafter, a CPU or the like provided to the extension board or the extension unit executes some of or all of the actual processing on the basis of an instruction from the program. The functions of the above-described embodiments are realized by processings by such an extension board or an extension unit as well.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-166252, filed Jun. 25, 2008, which is hereby incorporated by reference herein in its entirety.

What is claimed is:

1. An image processing apparatus which can be connected to an input device, wherein the input device has a first feature area detection unit for detecting a first feature area in image data, and wherein the image processing apparatus has a second feature area detection unit for detecting a second feature area in image data, the image processing apparatus comprising:
- an acquisition unit for acquiring the image data, to which the first feature area detection result detected by the first feature area detection unit of the input device has been added;
- a setting unit for setting a print setting for printing the image data;
- a selection unit for selecting the first feature area in the image data acquired by the acquisition unit or the second feature area in the image data detected by the second feature area detection unit of the image processing apparatus in accordance with the print setting set by the setting unit; and
- a correction unit for performing correction processing with respect to the image data by using the first feature area or the second feature area in the image data selected by the selection unit.

2. The image processing apparatus according to claim 1, wherein, in a case where the print setting set by the setting unit is a setting placing great importance on speed of printing, the selection unit selects the first feature area acquired by the acquisition unit, and in a case where the print setting set by the setting unit is a setting placing great importance on image quality, the selection unit selects the second feature area detected by the second feature area detection unit.

3. The image processing apparatus according to claim 1, wherein the first feature area detection unit and the second feature area detection unit detect a feature area in the image data through at least one of face detection, red-eye detection, and organ detection.

4. The image processing apparatus according to claim 1, further comprising a printing unit for printing the image data which is corrected by the correction unit.

5. An image processing apparatus which can be connected to an input device, wherein the input device has a first feature area detection unit for detecting a first feature area in image data, and wherein the image processing apparatus has a second feature area detection unit for detecting an image a second feature area in image data, the image processing apparatus comprising:
- an acquisition unit for acquiring the image data, to which the first feature area detection result detected by the first feature area detection unit of the input device has been added;
- a selection unit for selecting the first feature area in the image data acquired by the acquisition unit or the second feature area in the image data detected by the second feature area detection unit of the image processing apparatus in accordance with a status of a printing job in the image processing apparatus; and
- a correction unit for performing correction processing with respect to the image data by using the first feature area or the second feature area in the image data selected by the selection unit.

6. The image processing apparatus according to claim 1, wherein the correction unit includes an analysis unit for analyzing the image data on the basis of a feature area detected by the first feature area detection unit or the second feature area detection unit, and
wherein a correction factor of the image data is determined by the analysis unit.

7. The image processing apparatus according to claim 6, wherein the analysis unit analyzes the image data by at least one of statistical analysis, histogram analysis, frequency analysis, and binarized or multi-valued logic analysis in the image data.

8. The image processing apparatus according to claim 6, wherein the correction unit corrects the image data on the basis of the correction factor determined by the analysis unit.

9. An image processing method in an image processing apparatus which can be connected to an input device, wherein the input device has a first feature area detection unit for detecting a first feature area in image data, and wherein the image processing apparatus has a second feature area detection unit for detecting a second feature area in image data, the image processing method comprising:
- an acquisition step of acquiring the image data, to which the first feature area detection result detected by the first feature area detection unit of the input device has been added;
- a setting step of setting a print setting for printing the image data;
- a selection step of selecting the first feature area in the image data acquired by the acquisition step or the second feature area in the image data detected by the second feature area detection unit of the image processing apparatus in accordance with the print setting set by the setting step; and
- a correction step of performing correction processing with respect to the image data by using the first feature area or the second feature area in the image data selected by the selection step.

10. The image processing method according to claim 9, wherein, in a case where the print setting set by the setting step is a setting placing great importance on speed of printing, the first feature area acquired by the acquisition step is selected, and in a case where the print setting set by the setting step is a setting placing great importance on image quality of the image data, the second feature area detected by the second feature area detection unit is selected.

11. A non-transitory computer-readable storage medium on which a program is stored for making an image processing apparatus perform an image processing method, wherein the image processing apparatus can be connected to an input device, wherein the input device has a first feature area detection unit for detecting a first feature area in image data, and wherein the image processing apparatus has a second feature area detection unit for detecting a second feature area in image data, the image processing method comprising:
- an acquisition step of acquiring the image data, to which the first feature area detection result detected by the first feature area detection unit of the input device has been added;
- a setting step of setting a print setting for printing the image data;
- a selection step of selecting the first feature area in the image data acquired by the acquisition step or the second feature area in the image data detected by the second feature area detection unit of the image processing apparatus in accordance with the print setting set by the setting step; and
- a correction step of performing correction processing with respect to the image data by using the first feature area or the second feature area in the image data selected by the selection step.

12. The image processing apparatus according to claim 1, wherein, in a case where an item of print quality included in the print setting set by the setting unit is set to quick, the selection unit selects the first feature area acquired by the acquisition unit, and, in a case where the item of print quality included in the print setting set by the setting unit is set to fine, the selection unit selects the second feature area detected by the second feature area detection unit.

13. An image processing method in an image processing apparatus which can be connected to an input device, wherein the input device has a first feature area detection unit for detecting a first feature area in image data, and wherein the image processing apparatus has a second feature area detection unit for detecting a second feature area in image data, the image processing method comprising:
   an acquisition step of acquiring the image data, to which the first feature area detection result detected by the first feature area detection unit of the input device has been added;
   an selection step of selecting the first feature area in the image data acquired by the acquisition step or the second feature area in the image data detected by the second feature area detection unit of the image processing apparatus in accordance with a status of a printing job in the image processing apparatus; and
   a correction step of performing correction processing with respect to the image data by using the first feature area or the second feature area in the image data selected by the selection step.

* * * * *